Figure 3:
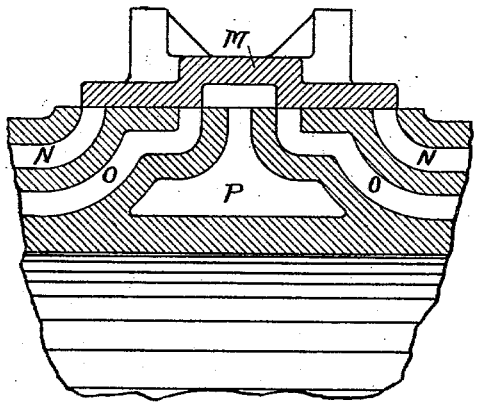

No. 753,367. PATENTED MAR. 1, 1904.
F. B. COREY.
STEAM PUMP.
APPLICATION FILED JUNE 7, 1901.
NO MODEL. 4 SHEETS—SHEET 1.
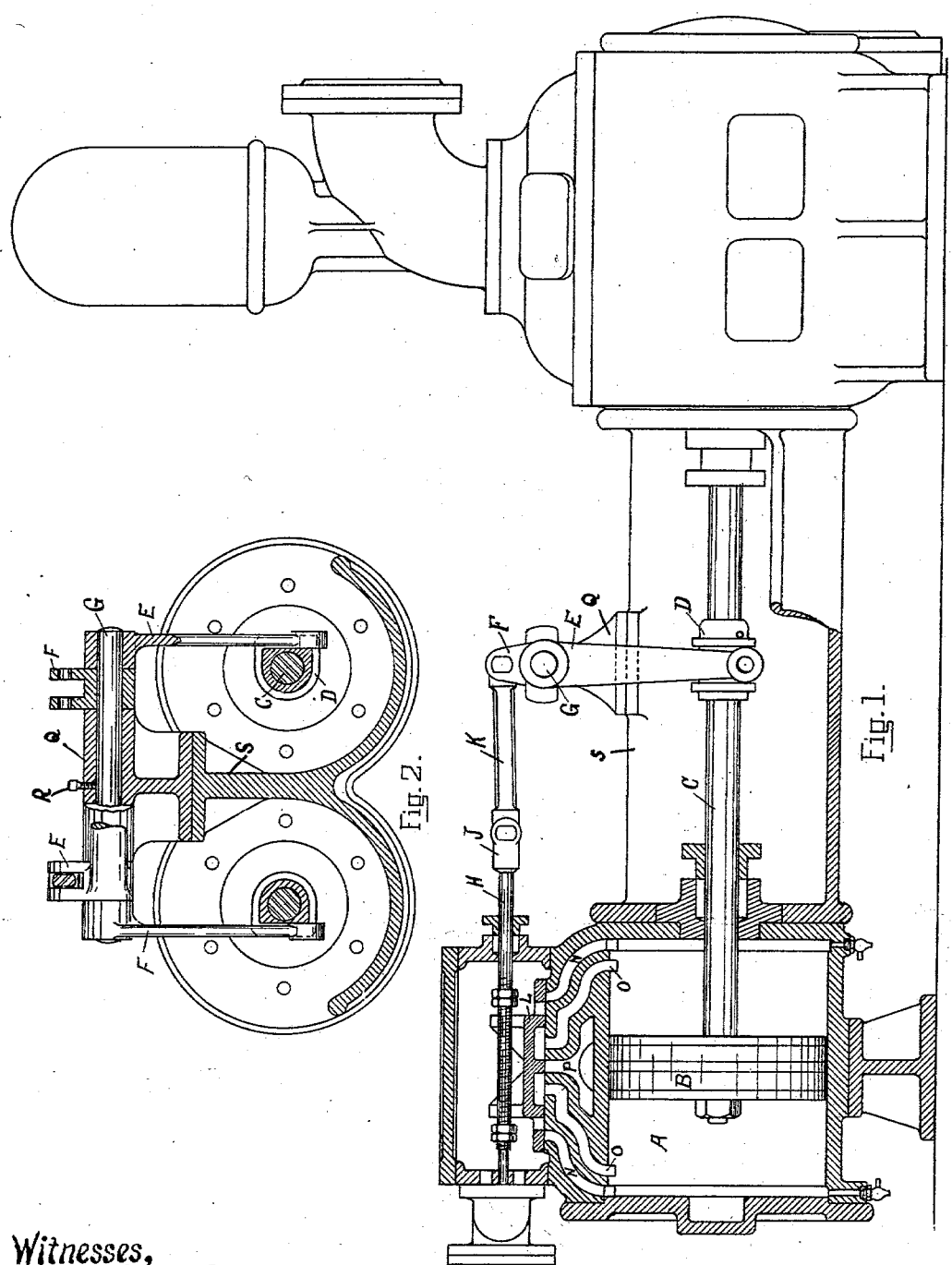
Witnesses,
Inventor,
Fred B. Corey No. 753,367. PATENTED MAR. 1, 1904.
F. B. COREY.
STEAM PUMP.
APPLICATION FILED JUNE 7, 1901.
NO MODEL. 4 SHEETS—SHEET 2.

Witnesses,
M. Evans Bouyer
W. O. Bellows.

Inventor,
Fred B. Corey.

No. 753,367. PATENTED MAR. 1, 1904.
F. B. COREY.
STEAM PUMP.
APPLICATION FILED JUNE 7, 1901.
NO MODEL. 4 SHEETS—SHEET 3.

Witnesses,
M. Grau Bonyu
W. B. Bellows

Inventor,
Fred B. Corey.

No. 753,367. PATENTED MAR. 1, 1904.
F. B. COREY.
STEAM PUMP.
APPLICATION FILED JUNE 7, 1901.
NO MODEL. 4 SHEETS—SHEET 4.

Witnesses,
C. H. Corey
D. W. Grigolit

Inventor,
Fred B. Corey.

No. 753,367. Patented March 1, 1904.

UNITED STATES PATENT OFFICE.

FRED B. COREY, OF SCHENECTADY, NEW YORK.

STEAM-PUMP.

SPECIFICATION forming part of Letters Patent No. 753,367, dated March 1, 1904.

Application filed June 7, 1901. Serial No. 63,595. (No model.)

*To all whom it may concern:*

Be it known that I, FRED BRAINARD COREY, a citizen of the United States, residing at Schenectady, in the county of Schenectady and State of New York, have invented certain new and useful Improvements in Steam-Pumps, of which the following is a specification.

My invention relates to steam-pumps, and especially to that class of steam-pumps known as "duplex," which consist, essentially, of two parallel steam-pump mechanisms, the steam-valve controlling the movement of each pump mechanism being actuated by the movement of the complementary pump mechanism.

The object of this invention is the production of a steam-pump of the class above mentioned which shall be of more simple construction than those heretofore produced and at the same time shall possess all of the well-known advantageous features of pumps of the duplex type. In duplex pumps heretofore used one steam-valve moves in the same direction as its driving-piston, while the other valve moves in the direction opposite to that of its driving-piston. In such a pump the valve-driving mechanism for each steam-cylinder differs from that of the complementary steam-cylinder, which construction results in multiplicity of parts and complications of construction, which it is the object of this invention to avoid.

My invention consists of a duplex pump comprising the combination, with two similar and parallel steam-cylinders and the pistons thereof, of a valve for controlling the supply of working fluid to each of the said cylinders, the motion of the valve of each cylinder being derived from the motion of the piston within the complementary cylinder, the motion of each of the said valves being the same relative to the motion of its driving-piston, the said valves being so constructed that for any similar position relative to the steam-cylinders their functions are reversed, as hereinafter described, and suitable means, hereinafter described, for communicating the necessary motion from the said pistons to the said controlling-valves.

In the accompanying drawings, which illustrate my invention, are shown the the various parts of a duplex steam-pump of improved construction.

Figure 6:
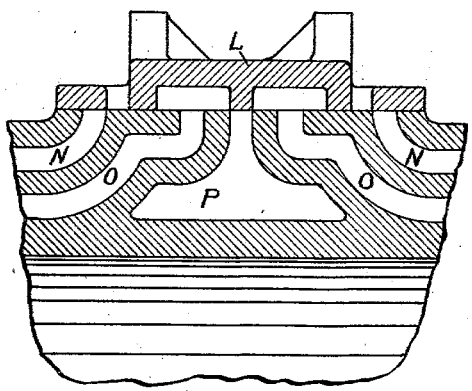
Figure 4:
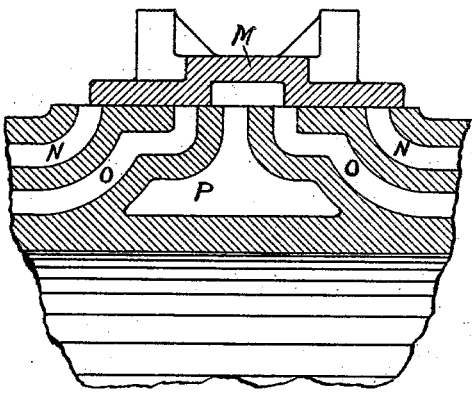
Figure 7:
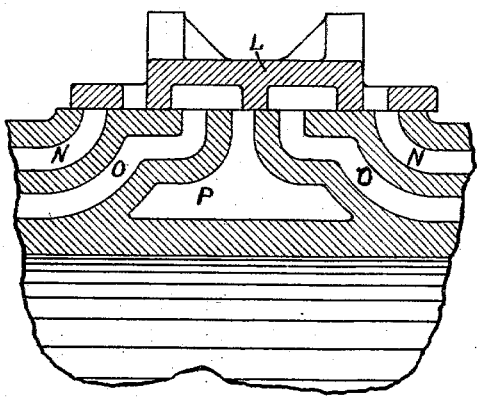
Figure 5:
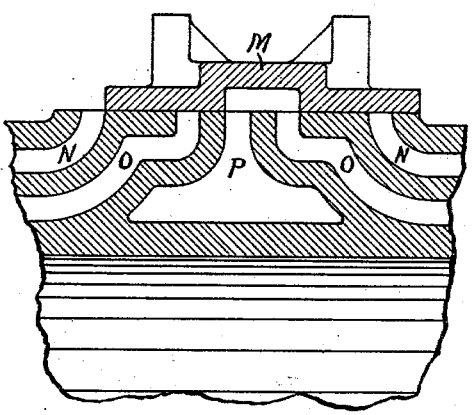
Figure 8:
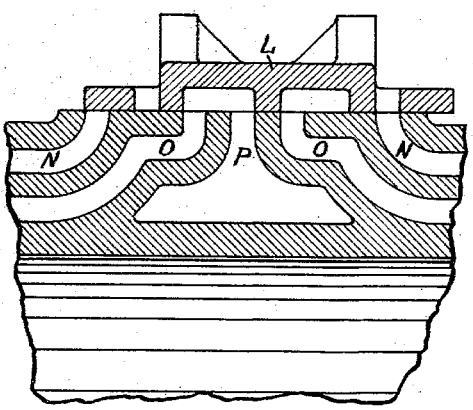
Figure 9:
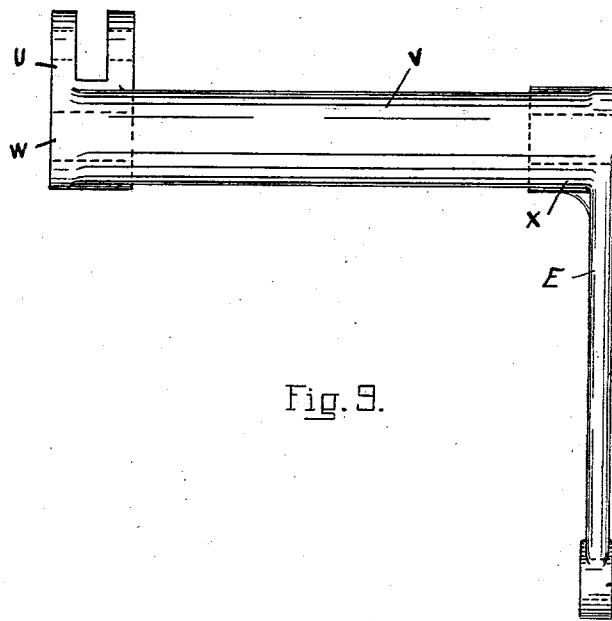
Figure 10:
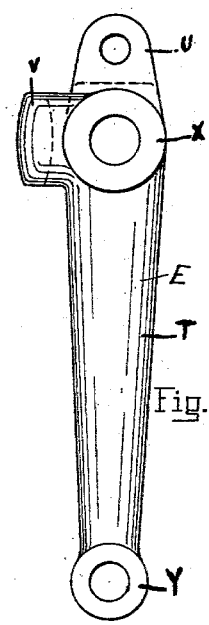
Figure 11:
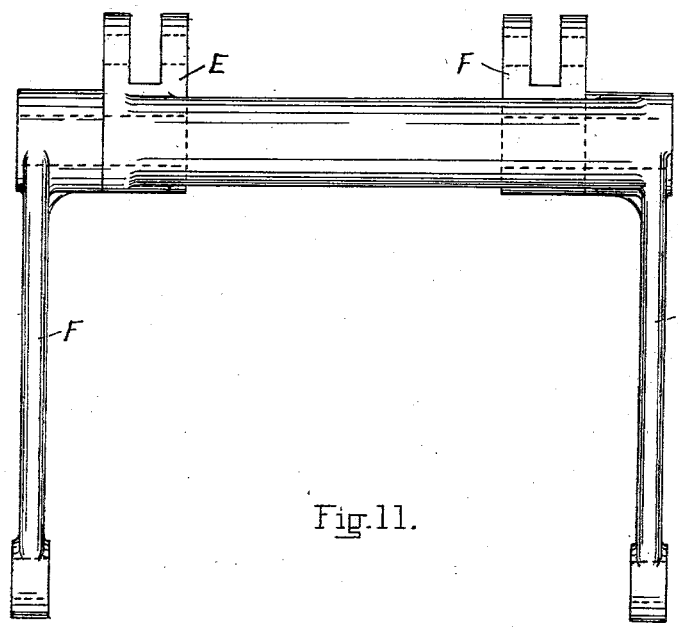
Figure 12:
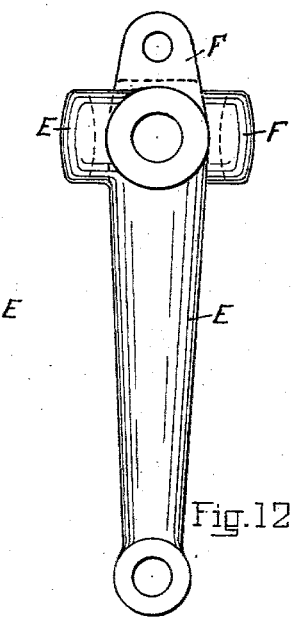
Figure 13:
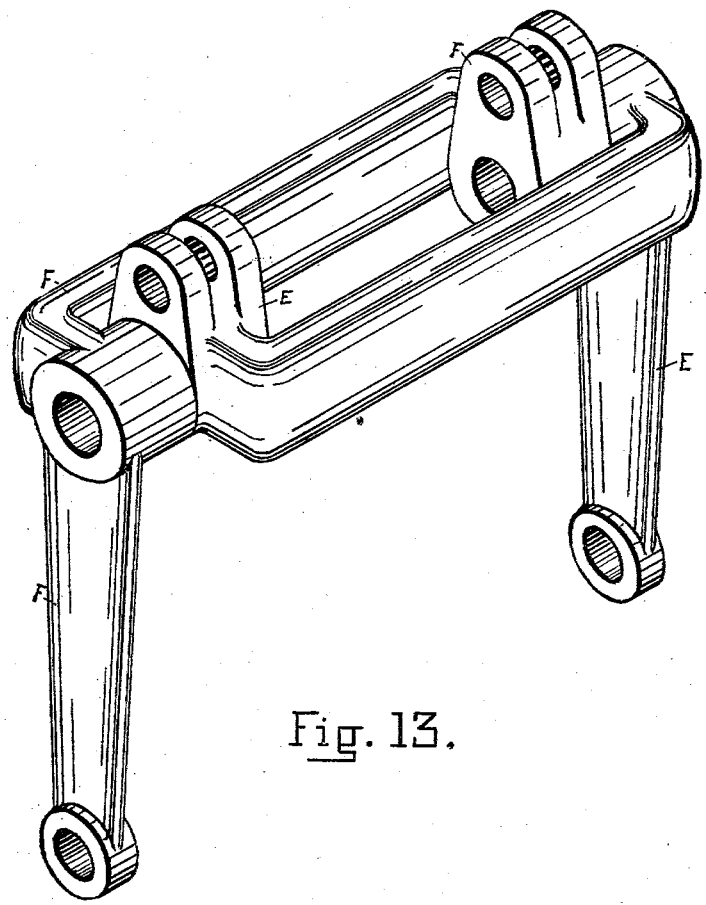

Figure 1 shows a view, partially in section, of a pump embodying my improvements. Fig. 2 shows a partial section through the yoke and bearing-stand of the said pump in a plane perpendicular to the axial lines of the piston-rods. Figs. 3, 4, and 5 show broken sections of one steam-cylinder and its actuating-valve, the said valve being shown in different phases of its motion relative to the said cylinder. Figs. 6, 7, and 8 show corresponding views of the complementary steam-cylinder. Figs. 9 and 10 show one of the valve-motion levers of improved construction, and Figs. 11 and 12 show the two levers assembled ready to be placed upon the pump and receive the single shaft on which they are intended to operate and by which they are supported and held in an interlocked position. Fig. 13 is a view in isometric perspective of the levers shown in Figs. 11 and 12.

In the drawings, A represents one of a pair of complementary steam-cylinders, and B the piston therein.

C is the piston-rod, to which is secured the cross-head or spool D.

E and F are the valve-motion levers, supported by the shaft G.

H is one of two similar valve-rods to which motion is transmitted through the valve-rod head J and the link K.

L and M are the two steam-valves for controlling the flow of steam or other working fluid to and from the cylinder through the steam-ports N N N N, the exhaust-ports O O O O, and the exhaust-passages P P.

Each of the said levers E and F is constructed of suitable material in the form shown plainly in Figs. 9 and 10, each complete lever consisting of a long arm T, with its hub X, a short arm U, with its hub W, and a connecting member or part V, joining the two hubs X and W, the said part V being located at a sufficient distance from the bore of the said hubs, so that it will clear the hubs of the complementary lever and the supporting-stand Q when they are all assembled together in their proper relation about the shaft G. The lower end of the long arm T carries the part Y, fitted to engage with the spool or crosshead D on the piston-rod C, while the upper end of the short arm U is adapted to be attached to the valve-rod link K. These levers E and F are supported and held in place by the shaft G and the stand Q, the said shaft extending through the bore of the hubs of the said levers E and F and through the bore of the said stand Q and being held in its proper position by the set-screw R or any other suitable means. The said stand Q may be fastened to the yoke S by bolts or other suitable fastening or may be cast integrally therewith.

The steam-valve of each pump mechanism being actuated by the motion of the piston of the complementary pump mechanism and the functions of each valve being reversed in respect to the phase of motion of its driving-piston, it is evident that the operation of this pump differs in no respect from the operation of a duplex pump of the usual construction.

In Fig. 1 the cylinder shown in section—that is, the cylinder whose operating-valve is L—is the one usually designated as the "left-hand" cylinder, and the farther one, (not seen in Fig. 1,) whose valve is M, is consequently the "right-hand" cylinder. Suppose the left-hand piston of the pump to be at a given instant at the head end of its cylinder—that is, at the extreme left. The valve-motion lever E has therefore moved the valve M of the right-hand cylinder forward or toward the water end of the pump, and as a consequence steam is entering the steam-port at the head end of the said right-hand cylinder and forcing its piston forward. During this forward motion of the right-hand piston the valve-motion lever F is moving the left-hand valve-rod backward or toward the head end of the cylinder, and after moving the greater part of its stroke distance the nuts or tappets on the valve-rod engage the valve L, moving it backward, admitting steam to the head end of the said left-hand cylinder, and exhausting the forward end of the same cylinder. Hence the left-hand piston will then move forward, which movement will impart motion to the valve-rod of the right-hand cylinder, which rod at the proper time will engage and move its valve, thus reversing the direction of motion of the right-hand piston. Thus the action will continue, each piston through the agency of the valve-motion levers E and F and the valves L and M reversing the motion of the complementary piston. In the pump shown in Fig. 1 the piston of the right-hand cylinder always leads the other in the direction of motion. Thus it is seen that by the simple means described I am able to secure an action of the complementary pump-pistons that is identical with the action of the pistons of duplex steam-pumps of the usual construction.

Having thus described my invention, what I claim as new, and desire to secure by Letters Patent, is—

1. In a duplex pump, the combination with two similar and parallel working cylinders, two pistons within the said cylinders, piston-rods in operative connection with the said pistons, and two dissimilar valves controlling the motion of the said pistons, of two similar levers for transmitting motion from the said piston-rods to the said valves, the said levers being supported by a single shaft and mutually interlocked to prevent endwise motion on the said shaft, substantially as described.

2. In a duplex pump, the combination, with two similar and parallel working cylinders, two pistons within the said cylinders, piston-rods in operative connection with the said pistons, and two dissimilar valves controlling the motion of the said pistons, of two interchangeably similar levers for transmitting motion from the said piston-rods to the said valves, the said levers being supported by a single shaft and held thereby in a mutually-interlocked position, substantially as described.

3. In a duplex pump, the combination with two parallel working cylinders and pistons therein, piston-rods in operative connection with the said pistons, and two valves for controlling the motion of the said pistons, of two similar and interlocking levers for transmitting motion from the said piston-rods to the said valves, the said levers having a common axis of oscillation, substantially as described.

4. In a duplex pump the combination with two parallel working cylinders and pistons therein, piston-rods in operative connection with the said pistons, and two valves for controlling the motion of the said pistons, of two interchangeably similar levers for transmitting motion from the said piston-rods to the said valves, the said levers being supported and interlocked by a single shaft, substantially as described.

5. In a duplex pump, the combination with two working cylinders and pistons therein, of valves for controlling the movement of the said pistons and two interchangeably similar levers for communicating motion between the said pistons and the said valves, the said levers being supported and interlocked upon a single shaft, substantially as described.

6. In a duplex pump, two parallel cylinders, movable pistons within the said cylinders, valves controlling the supply of working fluid to the said cylinders, and two similar levers, each of the said levers communicating motion from the piston of one cylinder to the valve of the complementary cylinder, the said levers being interchangeable and being supported by a single shaft and mutually interlocked thereon, substantially as described.

7. In a duplex pump, two interchangeable valve-actuating levers and a single shaft supporting the said levers, the two levers being mutually interlocked to prevent endwise motion of the said levers upon the said shaft, substantially as described.

8. In a duplex pump, two integral and mutually-interlocking valve-motion levers of similar construction, having a common axis of oscillation, substantially as described.

In testimony whereof I have signed my name to this specification in the presence of two subscribing witnesses.

FRED B. COREY.

Witnesses:
M. GRANT ZONYUN,
W. E. BELLOWS.